Figure 1:
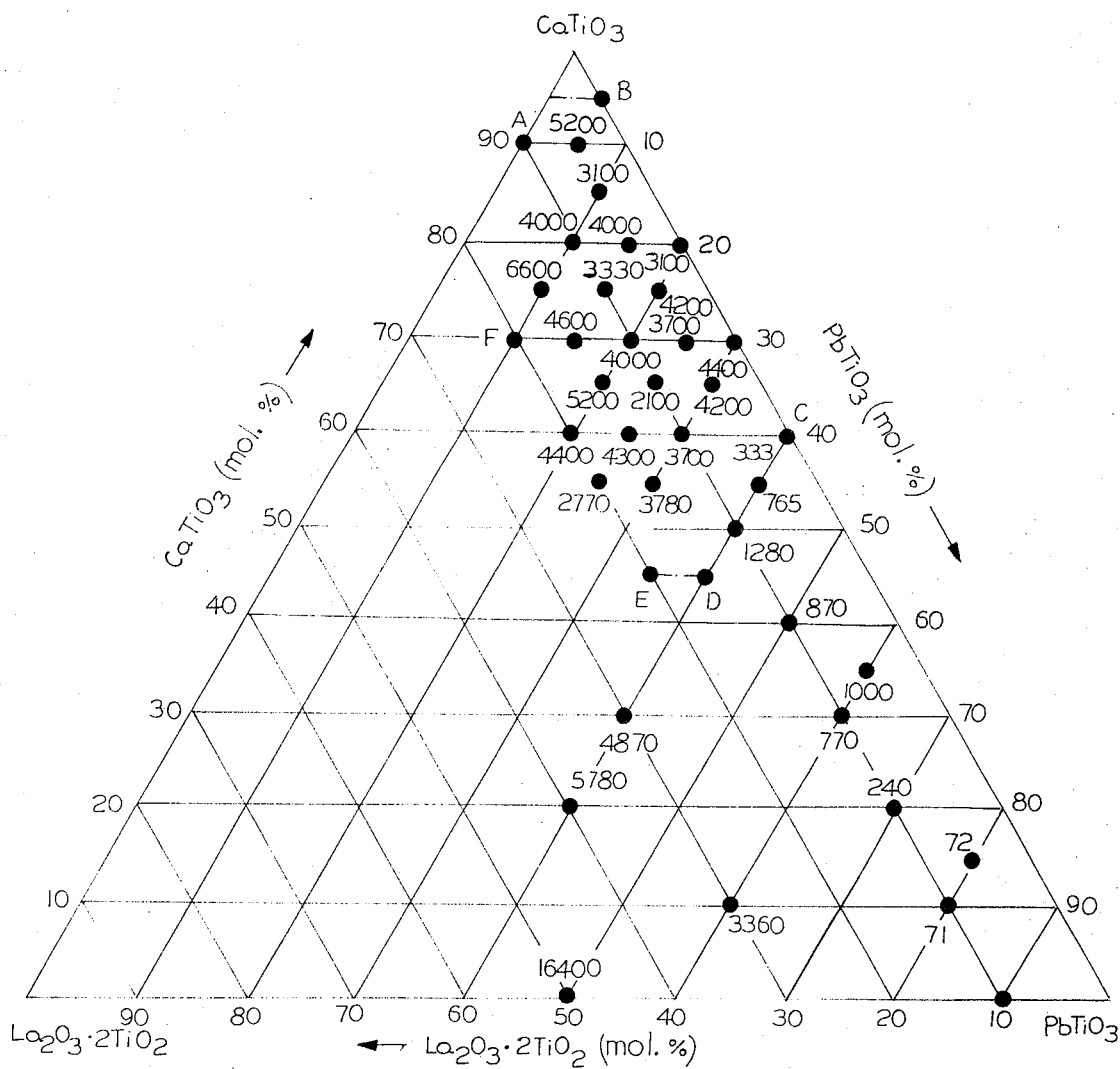

United States Patent
Yoshioka et al.

[15] 3,660,124

[45] May 2, 1972

[54] CERAMIC DIELECTRIC COMPOSITIONS COMPRISING CALCIUM, LANTHANUM AND LEAD TITANATES

[72] Inventors: Tsunehiko Yoshioka; Hisashi Satou, both of Hirasawa, Nikaho-machi, Yuri-gun, Akita-ken; Naoki Suda, Kisagata-machi, Yuri-gun, Akita-ken, all of Japan

[73] Assignee: TDK Electronic Co., Ltd., Tokyo, Japan

[22] Filed: June 13, 1969

[21] Appl. No.: 832,988

[30] Foreign Application Priority Data
June 25, 1969  Japan....................................43/43659
June 25, 1969  Japan....................................43/43660

[52] U.S. Cl. ..............................106/39 R, 106/46, 252/520
[51] Int. Cl. .....................................................C04b 33/00
[58] Field of Search..................106/39 R, 46; 252/63.5, 507, 252/509, 520; 317/258

[56] References Cited

UNITED STATES PATENTS 3,400,001  9/1968  Hasumi et al............................106/39
3,431,124  3/1969  Hayashi et al. ..........................106/39

FOREIGN PATENTS OR APPLICATIONS 574,577  1/1946  Great Britain...........................106/39

Primary Examiner—James E. Poer
Assistant Examiner—W. R. Satterfield
Attorney—Wenderoth, Lind & Ponack

[57] ABSTRACT

A ceramic dielectric composition consisting essentially of 45 to 95 mol percent of calcium titanate, 1 to 40 mol percent of lead titanate and 1 to 20 mol percent of lanthanum titanate is advantageous for use in temperature-compensating capacitors. Addition to the basic composition of 0.1 to 5 percent by weight of $Ta_2O_5$, $WO_3$ or CdO has the effect of broadening the temperature range for maturation, thus facilitating control of the firing conditions in the manufacture of the ceramic body.

9 Claims, 4 Drawing Figures

CERAMIC DIELECTRIC COMPOSITIONS COMPRISING CALCIUM, LANTHANUM AND LEAD TITANATES

The present invention relates to ceramic dielectric compositions advantageous, in particular, for use in temperature-compensating capacitors.

A ternary system comprising calcium titanate ($CaTiO_3$), magnesium titanate ($MgTiO_3$) and lanthanum titanate ($La_2O_3 \cdot 2TiO_2$) is a typical example of ceramic dielectric material hitherto utilized in temperature-compensating capacitors. The said ternary composition has rather a low dielectric constant around 100 and a Q-value which is not always satisfactory. For instance, one of the most useful ceramic compositions of this is given by the following basic proportion:

| component | mol percent |
|---|---|
| $CaTiO_3$ | 90.5 |
| $MgTiO_3$ | 3.0 |
| $La_2O_3 \cdot 2TiO_2$ | 6.5 | to which is added 0.2 percent by weight of $MnCO_3$. The fired body of this composition exhibits the following characteristics:

| Dielectric Constant | 130 |
|---|---|
| Temperature Coefficient of Capacitance | $-780 \times 10^{-6}/°C$ |
| Q-value | 5200 |

The fundamental object of the present invention, in one aspect thereof, is to provide ceramic dielectric compositions with more advantageous dielectric properties compared with those hitherto utilized as temperature-compensating capacitors. The ceramic dielectric compositions of the present invention are based on the ternary system comprising calcium titanate, lead titanate and lanthanum titanate. A ceramic body having a dielectric constant up to 300 with the temperature coefficient ranging from $-700°$ to $-2,200 \times 10^{-6}/°C$ and a Q-value up to 7,000 is obtained by a combination of the said ingredients within the following range of proportion: 45 to 95 mol percent calcium titanate, 1 to 40 mol percent lead titanate and 1 to 20 mol percent lanthanum titanate.

The ceramic body of this aspect of the present invention is produced by the following procedure:

The raw materials are first mixed, pre-sintered in an oxidizing atmosphere, then ground to a powder. The powder is pressed into a desired shape with the addition of a suitable binder, then fired again to maturity in an oxidizing atmosphere at a temperature of 1,200° to 1,380° C.

The following example is given for the better understanding of this aspect of the invention.

EXAMPLE 1

The raw materials, titanium oxide, calcium carbonate, lead monoxide and lanthanum oxide were weighed so that the fired body would have the composition:

| component | mol percent |
|---|---|
| $CaTiO_3$ | 74.0 |
| $PbTiO_3$ | 16.1 |
| $La_2O_3 \cdot 2TiO_2$ | 9.9 |

The ingredients were first milled together to achieve thorough mixing. The mix was then pre-sintered in an oxidizing atmosphere and after cooling, ground to powder. After adding polyvinyl alcohol as a binder, the powder was pressed into a disk 16.5 mm in diameter and 0.7 mm thick under a pressure of 4 tons/$cm^2$, which was then fired to maturity in an oxidizing atmosphere at 1,380° C. The ceramic body thus obtained showed the characteristics:

| Dielectric Constant | 153.0 |
|---|---|
| Temperature Coefficient of Capacitance | $-796 \times 10^{-6}/°C$ |
| Q-value | 3730 | where the measurements were made at 25° C. and at a frequency of 1 MC/s. The temperature coefficient was measured in the temperature region from $-30°$ to $+85°$ C., where the capacitance was found to change linearly with temperature.

The dielectric properties of a number of ceramic compositions according to this aspect of the present invention produced by the procedures similar to those adopted in the above example are tabulated in Table 1.

TABLE 1

| Number | Composition (mol percent) | | | Dielectric constant ($\epsilon$) | Temperature coefficient of capacitance ($\times 10^{-6}/°$ C.) | Q-value |
|---|---|---|---|---|---|---|
| | $CaTiO_3$ | $PbTiO_3$ | $La_2O_3 \cdot 2TiO_2$ | | | |
| 1 | 74.0 | 16.1 | 9.9 | 153.0 | $-796$ | 3,730 |
| 2 | 73.0 | 16.7 | 10.3 | 155.5 | $-796$ | 6,380 |
| 3 | 65.0 | 24.0 | 11.0 | 176.5 | $-927$ | 4,540 |
| 4 | 75.0 | 17.2 | 7.8 | 173.5 | $-943$ | 6,810 |

The ternary diagrams of FIGS. 1 to 4 show how the dielectric properties of a ceramic body produced by the method similar to that employed in Example 1 vary as a function of the composition.

Figure 2:
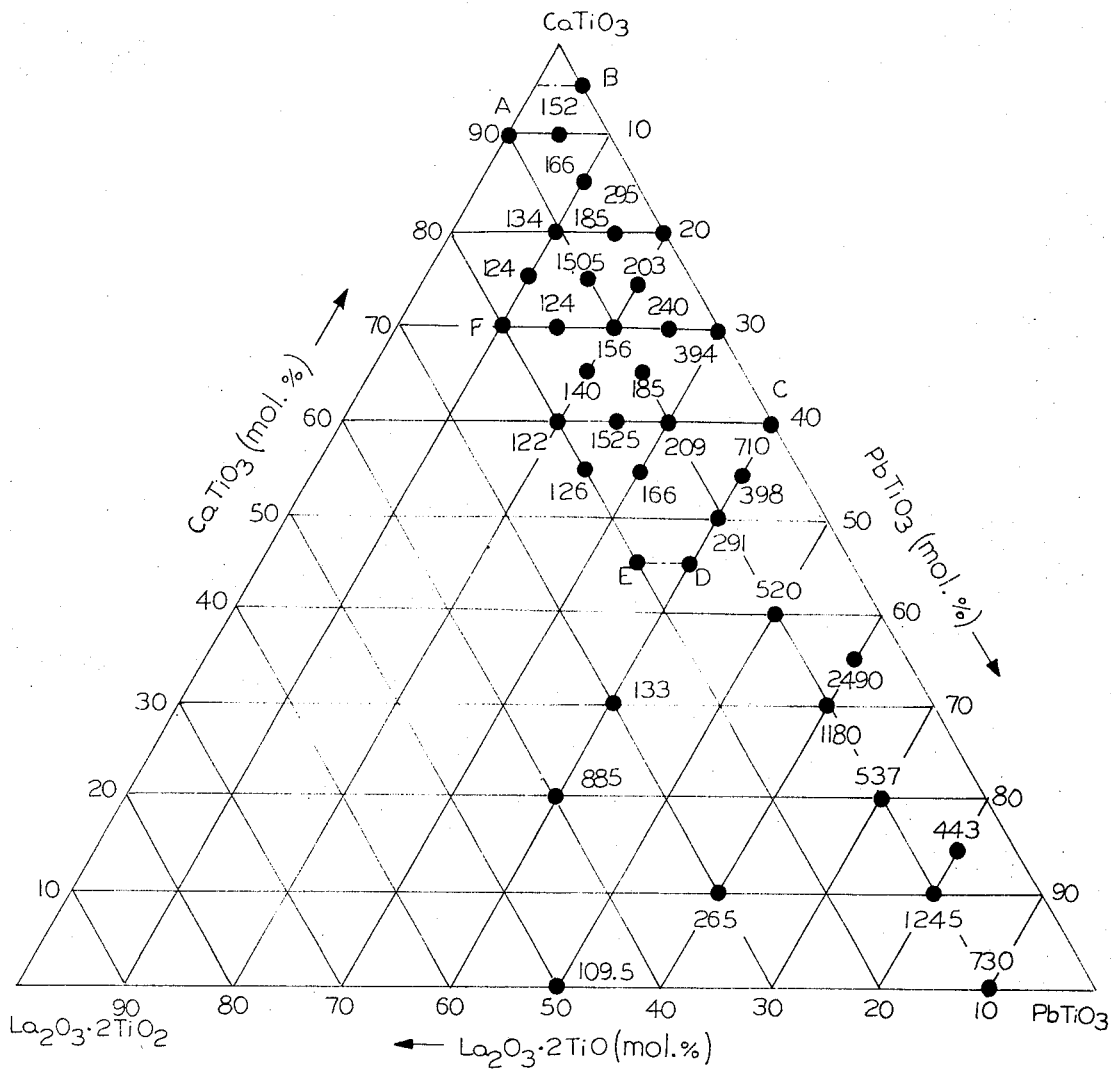
Figure 3:
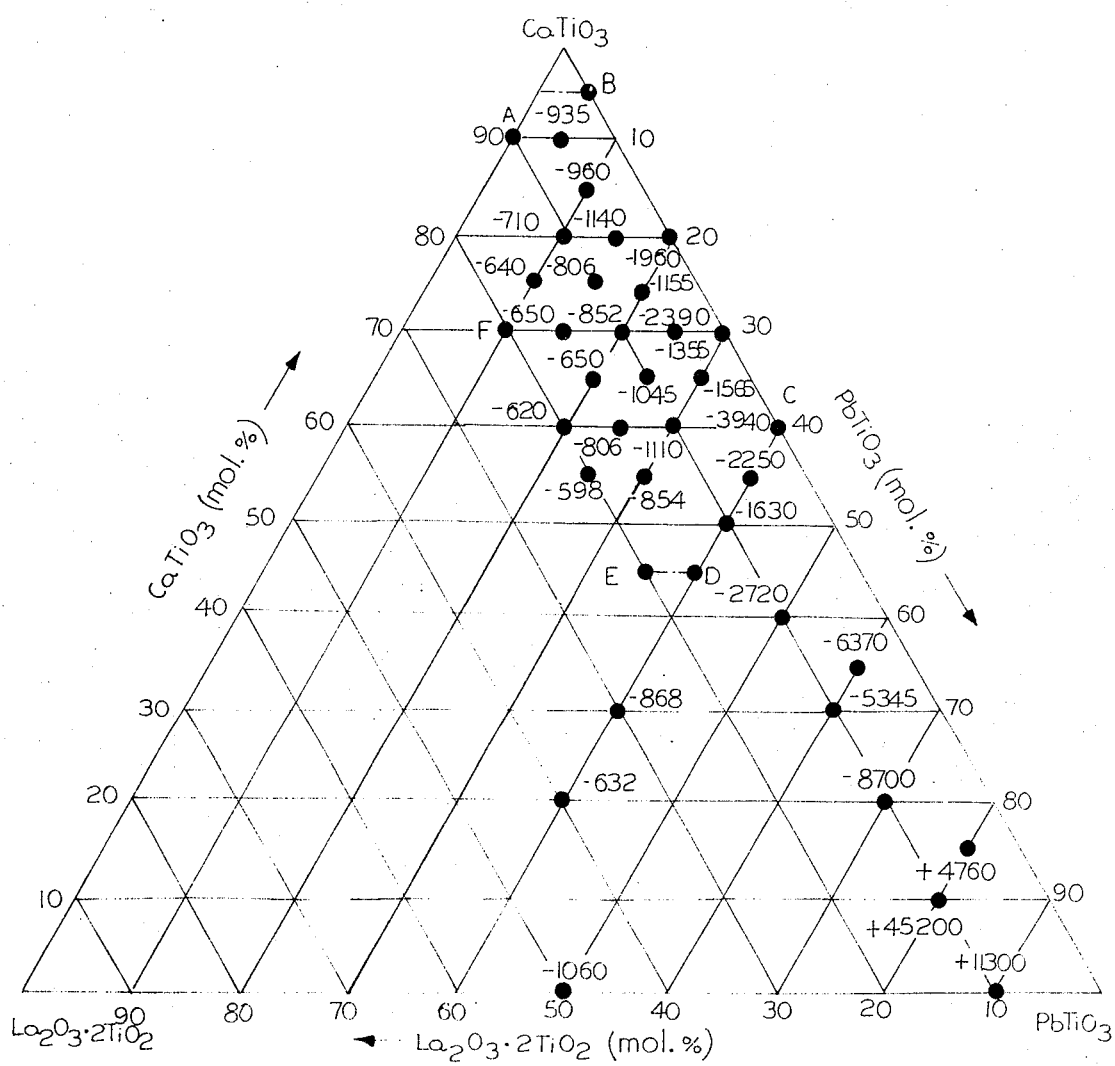
Figure 4:
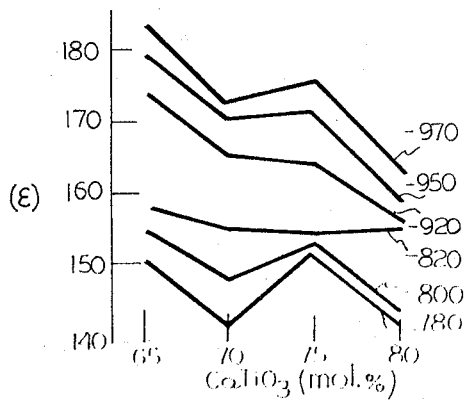

The Q-values for various compositions are given in FIG. 1, where the proportion of each of the end-members calcium titanate, lead titanate and lanthanum titanate is given in mol percent. The numerical value on each point of the diagram indicates the Q-value of the corresponding composition. The diagram of FIG. 2 shows how the dielectric constant depends on the composition, while FIG. 3 shows the temperature coefficient of capacitance measured in the temperature range from $-30°$ to 85° C. and the values are given in $10^{-6}/°$ 8c C. FIG. 4 shows how the dielectric constant of a ceramic body which has a given value of the temperature coefficient of capacitance varies as a function of the fraction of calcium titanate. The numerical value attached to each of the solid curves in the figure denotes the temperature coefficient in $10^{-6}/<v$ C.

From the data on the dielectric properties shown in the example, Table 1 and the accompanying drawings, it is seen that the most favorable properties are achieved by the combination of 75.0 mol percent calcium titanate, 17.2 mol percent lead titanate and 7.8 mol percent lanthanum titanate or compositions around this proportion.

Desirably, the composition of the present invention is limited to the following range:

| component | mol percent |
|---|---|
| $CaTiO_3$ | 45 to 95 |
| $PbTiO_3$ | 1 to 40 |
| $La_2O_3 \cdot 2TiO_2$ | 1 to 20 |

To be more exact, a composition belonging to the area of the ternary diagram enclosed by the points of the composition as A-B-C-D-E-F is most desirable, where the points from A to F are defined as follows:

| | Composition (mol %) | | |
|---|---|---|---|
| | $CaTiO_3$ | $PbTiO_3$ | $La_2O_3 \cdot 2TiO_2$ |
| A | 90 | 1 | 9 |
| B | 95 | 5 | 0 |
| C | 60 | 40 | 0 |
| D | 45 | 40 | 15 |

| E | 45 | 35 | 20 |
| F | 70 | 10 | 20 |

The reasons for limiting the composition to the said range are: When the amount of lanthanum titanate exceeds 20 mol percent, vitrification of the body becomes difficult. When the amount of lead titanate is over 40 mol percent, the Q-value would become unfavorably low, while the inclusion of calcium titanate in excess of 95 mol percent results in the decrease of the dielectric constant to an extent no more favorable in comparison with ceramic dielectric materials hitherto utilized as temperature-compensating capacitors.

The present invention, in the precedingly-described aspect thereof, thus provides ceramic dielectrics with high dielectric constant advantageous not only in the reduction of the size of capacitors but also in the reduction of the cost needed for shaping and other processes.

While a ceramic body with favorable properties can be obtained by the basic composition only, according to a second aspect of the invention, the addition of one of the metal oxides, tantalum oxide ($Ta_2O_5$), tungsten oxide ($WO_3$) and cadmium oxide, in small amount (0.1 to 5 percent by weight) has the effect of broadening the temperature range for maturation, thus making the control of the firing condition easier. A ceramic body thus produced has a dielectric constant up to 300 with a uniform temperature coefficient ranging from $-700°$ to $-950 \times 10^{-6}/°C$. in the temperature range of $-30°$ to $85°C$. and a Q-value up to 7,000.

The following examples are given for the better understanding of the second aspect of the present invention.

EXAMPLE 2

The raw materials were weighed according to the composition:

|  | mol percent |
|---|---|
| $CaTiO_3$ | 74.0 |
| $PbTiO_3$ | 16.1 |
| $La_2O_3 \cdot 2TiO_2$ | 9.9 | to which are added tantalum oxide ($Ta_2O_5$) in amount corresponding to 0.5 percent by weight of the total weight of the above components. The ingredients were thoroughly mixed, pressed into shape, then pre-sintered in air at $1,250°C$. for 2 hours. The fired body was then ground to a powder, a small amount of polyvinyl alcohol added, and the whole pressed into a disk 16.5 mm in diameter and 0.7 mm thick under a pressure of 4 tons/cm². The disk was then fired to maturity in air at a temperature from $1,310°$ to $1,330°C$. The ceramic body thus produced exhibited the following characteristics:

| Dielectric constant | 153.0 |
|---|---|
| Temperature coefficient of capacitance | $-796 \times 10^{-6}/°C$ ($-30°C$ to $85°C$) |
| Q-value | 3730 | where the measurements were performed at $25°C$. and at a frequency of 1 MC/s.

Table 2 shows the characteristics of a number of ceramic compositions according to the present invention produced by the method similar to that described in the preceding example and measured also under the same conditions as given in the example.

As in the first aspect of the invention, the diagrams of FIGS. 1 to 3 show how the dielectric properties of a ceramic body according to the said aspect produced by the method similar to that of Example 2 vary as a function of composition. The Q-values of various ceramic compositions are shown in FIG. 1. The end-members of the ternary diagram are calcium titanate ($CaTiO_3$), lead titanate ($PbTiO_3$) and lanthanum titanate ($La_2O_3 \cdot TiO_2$), of which the proportion is given in mol percent. The numerical value at each point of the diagram denotes the Q-value of the corresponding ceramic composition. FIG. 2 shows how the dielectric constant depends on the composition and FIG. 3 shows how the temperature coefficient of capacitance measured in the temperature range from $-30°$ to $85°C$. varies as a function of composition, where the values are given in $10^{-6}/°C$.

From the data on the dielectric properties shown in Example 2, Table 1 and the accompanying drawings, it is seen that the most favorable properties are achieved by the combination of 75.0 mol percent calcium titanate ($CaTiO_3$), 17.2 mol percent lead titanate ($PbTiO_3$) and 7.8 mol percent lanthanum titanate ($La_2O_3 \cdot 2TiO_2$) or compositions in this vicinity.

As in the first aspect, the composition of the second aspect of the invention is limited to the following range:

|  | mol percent |
|---|---|
| $CaTiO_3$ | 45 to 95 |
| $PbTiO_3$ | 1 to 40 |
| $La_2O_3 \cdot 2TiO_2$ | 1 to 20 | but, according to the second aspect, there is added one of the metal oxides tantalum oxide ($Ta_2O_5$), tungsten oxide ($WO_3$) or cadmium oxide (CdO) in an amount of 0.1 to 5 percent by weight of the total weight of the titanates.

The reasons for limiting the composition to the said range are: When the amount of calcium titanate ($CaTiO_3$) is under 45 mol percent or the amount of lead titanate exceeds 40 mol percent, the Q-value becomes rather low. The inclusion of calcium titanate ($CaTiO_3$) in excess of 95 mol percent results in a low dielectric constant no more favorable compared with ceramic dielectrics hitherto utilized. When the amount of lanthanum titanate ($La_2O_3 \cdot 2TiO_2$) exceeds 20 mol percent, maturation of the body becomes difficult. The addition of one of the said metal oxides in amount less than 0.1 percent by weight has no appreciable effect, while the addition in excess of 5 percent is either unnecessary or may have an undesirable effect on dielectric properties.

The advantages of adding metal oxide to the basic compositions of the invention, e.g. to the following composition:

|  | mol percent |
|---|---|
| $CaTiO_3$ | 73.0 |
| $PbTiO_3$ | 16.7 |
| $La_2O_3 \cdot 2TiO_2$ | 10.3 | are shown by the following tabulation, demonstrating that the sintering temperature changes effectively as follows:

| additive | weight percent | sintering temperature (°C) |
|---|---|---|
| none | 0 | 1330 to 1350 |
| $Ta_2O_5$ | 3 | 1300 to 1330 |
| CdO | 3 | 1300 to 1340 |
| $WO_3$ | 3 | 1280 to 1320 |

The present invention thus makes it possible to product readily maturable ceramic dielectric materials which possess

TABLE 2

| Number | Composition | | | | Dielectric constant ($\epsilon$) | Temperature coefficient of capacitance ($\times 10^{-6}/°C$.) | Q-value |
|---|---|---|---|---|---|---|---|
|  | $CaTiO_3$, mol percent | $PbTiO_3$, mol percent | $La_2O_3 \cdot 2TiO_2$ mol percent | $Ta_2O_3$, weight percent |  |  |  |
| 1 | 74.0 | 16.1 | 9.9 | 0.5 | 153.0 | −796 | 3,730 |
| 2 | 73.0 | 16.7 | 10.3 | 0.5 | 155.5 | −796 | 6,380 |
| 3 | 65.0 | 24.0 | 11.0 | 0.5 | 176.5 | −927 | 4,540 |
| 4 | 75.0 | 17.2 | 7.8 | 0.5 | 173.5 | −943 | 6,810 | high Q-values and high values of dielectric constant with low values of temperature coefficient, suitable for use as capacitors for temperature compensation.

What is claimed is:

1. A fired ceramic dielectric composition characterized by a temperature coefficient ranging from $-700°$ to $-2,200 \times 10^{-6}$ /° C. over the temperature range of $-30°$ to $85°$ C. consisting essentially of 45 to 95 mole percent calcium titanate, 1 to 40 mol percent lead titanate and 1 to 20 mol percent lanthanum titanate.

2. A fired composition according to claim 1, and further containing tantalum oxide, tungsten oxide or cadmium oxide in an amount corresponding to 0.1 to 5 percent by weight of the total weight of the said metal titanates.

3. A fired composition according to claim 1 wherein the mol percent of calcium titanate is 74.0, the mol percent of lead titanate is 16.1 and the mol percent of lanthanum titanate is 9.9.

4. A fired composition according to claim 1 wherein the mol percent of calcium titanate is 73.0, the mol percent of lead titanate is 16.7 and the mol percent of lanthanum titanate is 10.3.

5. A fired composition according to claim 1 wherein the mol percent of calcium titanate is 65.0, the mol percent of lead titanate 24.0 and the mol percent of lanthanum titanate is 11.0.

6. A fired composition according to claim 1 wherein the mol percent of calcium titanate is 75.0, the mol percent of lead titanate is 17.2 and the mol percent of lanthanum titanate is 7.8.

7. A fired composition according to claim 6 which also contains tantalum oxide in an amount of 0.5 weight percent based on the total weight of the metal titanates.

8. A fired composition according to claim 4 which further contains cadmium oxide in an amount of 3 weight percent, based upon the total weight of the metal titanates.

9. A fired composition in accordance with claim 4 which further contains tungsten oxide in an amount of 3 weight percent, based upon the total weight of the metal titanates.

* * * * *